(No Model.) 2 Sheets—Sheet 1.

C. W. SLEEPER.
DEVICE FOR FORMING TIN CANS.

No. 402,774. Patented May 7, 1889.

WITNESSES:
William Martin
Allan Moyle

INVENTOR,
Charles W. Sleeper.

(No Model.) 2 Sheets—Sheet 2.
C. W. SLEEPER.
DEVICE FOR FORMING TIN CANS.
No. 402,774. Patented May 7, 1889.
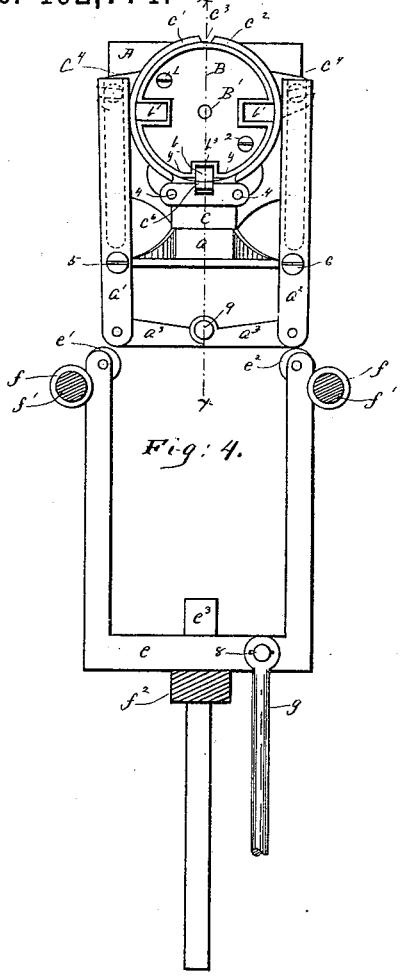
Fig. 4.
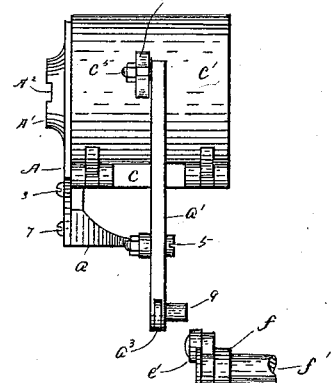
Fig. 5.
Fig. 6.
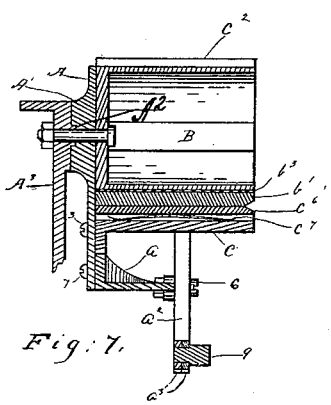
Fig. 7.
WITNESSES:
William Martin
Allan Moyle
INVENTOR,
Charles W. Sleeper
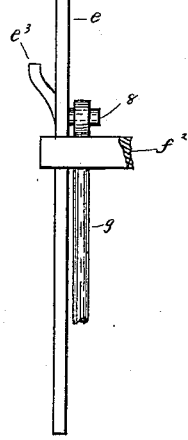

UNITED STATES PATENT OFFICE.

CHARLES W. SLEEPER, OF ISLAND POND, VERMONT.

DEVICE FOR FORMING TIN CANS.

SPECIFICATION forming part of Letters Patent No. 402,774, dated May 7, 1889.

Application filed January 4, 1889. Serial No. 295,454. (No model.)

*To all whom it may concern:*

Be it known that I, CHARLES W. SLEEPER, a citizen of the United States, residing at Island Pond, in the county of Essex and State of Vermont, have invented a new and useful Device for Forming the Bodies of Tin-Cans, of which the following is a specification.

My invention relates to improvements in forming devices in which movable clamps act to form the bodies (cut to proper size) about an adjustable cylinder and to hold the said bodies securely in place while they are being soldered.

The object of my invention is, first, to provide reliable means of adjusting the cylinder so as to enlarge or decrease the size of the can, and means for removing the can when soldered; second, to provide means for forming the can-body about an adjustable cylinder; third, to provide means for locking the forming-clamps in position; fourth, to provide means for attaching the forming device to any suitable seaming-machine, (machine for forming and soldering the bodies of tin cans.) I accomplish these objects by means of the mechanism illustrated in the accompanying drawings, in which—

Figure 1:
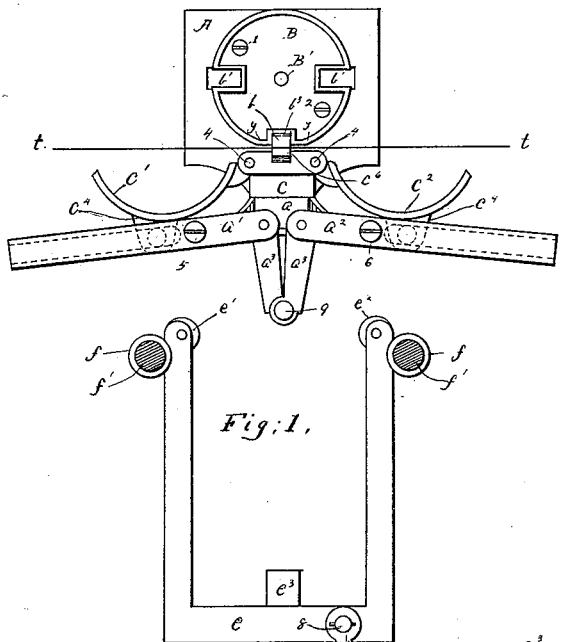
Figure 2:
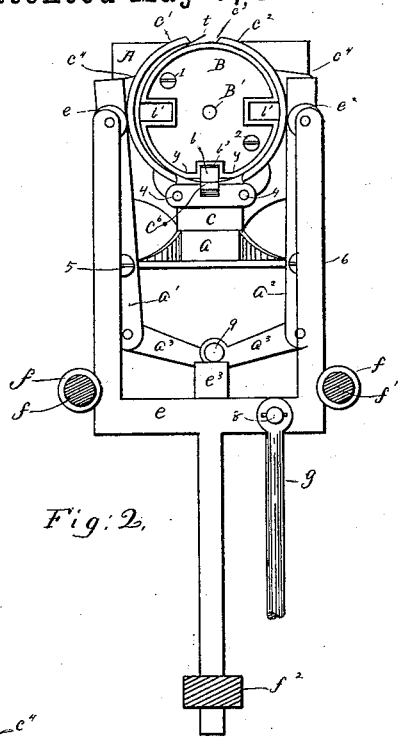
Figure 3:
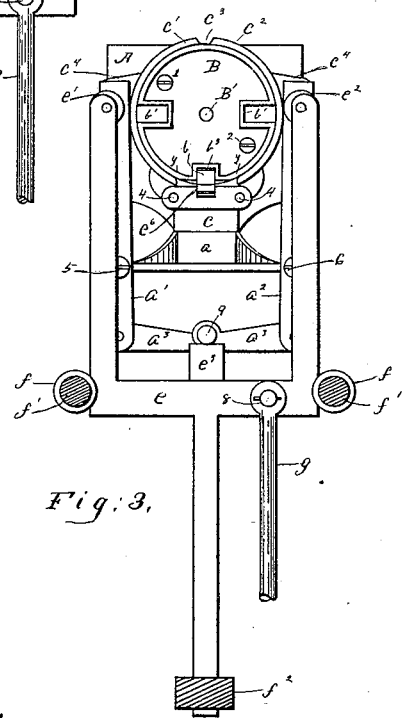

Figure 1 is a front elevation of the device, showing the position of the parts when the clamps $c'$ $c^2$ are opened and the can-body $t\,t$ in position to be formed about the cylinder. Fig. 2 is a front elevation of the device, showing the position of the parts at the instant that clamp $c^2$ is closed. Fig. 3 is a front elevation of the device, showing position of the parts at the instant that both clamps are closed. Fig. 4 is a front elevation of the device with clamps closed and fork $e$ dropped. Fig. 5 is a side elevation of Fig. 4. Fig. 6 is a detail of locking-arm. Fig. 7 is a sectional detail taken at line $x\,x$, Fig. 4, and showing a portion of frame $A^3$.

The work-plate A is designed to support the working parts of the device, and is provided with a hub, A', having a hole through its center and a slot, $A^2$, across its face, for convenience of securing to a suitable machine by passing a bolt through the hub, and providing a projection to fit the said slot $A^2$, as shown in Fig. 7. A cylinder, B, is secured to the work-plate A by screws 1 2, in such position that the hole B' shall coincide with the hole in work-plate A.

A clamp-supporting bracket, $c$, is secured to the work-plate A by the screws 3. On either side of the bracket $c$ are movable clamps $c'$ $c^2$, hinged upon pins 4 4 in such manner that when moved upward they grasp and fit the cylinder, leaving an opening, $c^3$, between their edges.

A bracket, $a$, (secured to the work-plate A by two screws, 7,) serves to support two locking-arms, $a'$ $a^2$, which are pivoted upon the screws 5 6 and connected at their lower ends by a "toggle-joint," $a^3$. The locking-arms $a'$ $a^2$ are provided with a slot or groove, $a^4$, and the clamps $c'$ $c^2$ are provided with ears $c^4$ $c^4$, to which are secured the studs $c^5$, which carry suitable rollers to work loosely in the grooves $a^4$ of the locking-arms. A false piece, $b$, is fitted loosely into the lower part of the cylinder B and is made true with its outer circumference. A false piece, $c^6$, is fitted loosely into the bracket $c$ and is held upward by means of a spring, $c^7$, Fig. 4. The cylinder B is slightly flattened between the points $g\,g$.

For closing the clamps I have provided a forked piece, $e$, carrying rollers $e'$ $e^2$, and guided by the rollers $f\,f$, (upon the studs $f'$ $f'$,) and the block $f^2$, which is mortised to receive the tail $e^4$ of the fork $e$. A pin, 8, is provided to receive a connecting-rod, $g$, which will connect with a suitable cam-lever or treadle, by means of which the fork $e$ will be operated. The studs $f'$ $f'$ and the block $f^2$ will be attached to the frame of machine upon which the device is used.

In operation the tin-can body (cut to size) is inserted (by any convenient means) between the false pieces $b$ and $c^6$, (as shown by the line $t\,t$, Fig. 1,) and pushed back against the work-plate A. The false pieces $b$ and $c^6$ are beveled at their front ends, that the tin may enter freely between them. (See Fig. 4.) To close the clamps and thus form the body about the cylinder, the fork $e$ is made to rise steadily, the rollers $e'$ $e^2$ striking the clamps and closing them about the cylinder.

To insure the lapping of the tin the proper way, the roller $e^2$ is made to force the clamp $c^2$ close to the cylinder, while the roller $e'$ is placed farther away, (see Fig. 2,) the clamp $c'$ being finally closed by the projection $e^3$ striking the pin 9, and thus forcing the toggle-joint $a^3$ up past its center line and securely locking the clamps in position. (See Fig. 3.)

The cylinder B is provided with recesses $b'$ $b'$, for convenience of removing the can-body when soldered. To adjust the cylinder so as to vary the size of cans, the false piece $b$ is pressed down and a piece of metal, $b^3$, inserted between it and the cylinder, thus increasing the perimeter of the can formed about it. The false piece $b$ should be even with the flattened portion of the cylinder when there is no metal between, in which position the can formed would be slightly smaller than if the cylinder were round, and may be made larger by inserting thick or thin pieces of metal, as required.

What I claim as my invention, and desire to secure by Letters Patent, is—

1. In a forming device for seaming-machines, a cylinder slightly flattened at its lower side and provided with a false piece, $b$, so arranged in the flattened portion of the cylinder that thin pieces of metal may be inserted between the false piece and the cylinder to increase the size of the said cylinder, and provided with two recesses, $b'$ $b'$, into which the fingers or any convenient instrument may be inserted to remove the can-body from the cylinder after it has been soldered, substantially as described, and for the purpose set forth.

2. In a forming device for seaming-machines, the cylinder B and false piece $b$, combined with the bracket $c$, to which are hinged the clamps $c'$ $c^2$, and the false piece $c^6$, so arranged in the bracket $c$ as to coincide with the false piece $b$, and a spring, $c^7$, to press the false piece $c^6$ against the false piece $b^2$, or against the can-bodies as they are inserted between the said pieces, substantially as described, and for the purpose set forth.

3. In a forming device for seaming-machines, the cylinder B, the bracket $c$, and clamps $c'$ $c^2$, combined with the locking-arms $a'$ $a^2$ and the toggle-joint $a^3$, and with means for supporting the locking-arms and operating the clamps and toggle-joint, substantially as described, and for the purpose set forth.

CHARLES W. SLEEPER.

Witnesses:
ALLAN MOYLE,
O. G. DAVIS.